US012715301B2

(12) United States Patent
Kennedy et al.

(10) Patent No.: US 12,715,301 B2
(45) Date of Patent: Aug. 25, 2026

(54) ELECTRIFIED REAR AXLE REGENERATIVE HAND BRAKE

(71) Applicant: FCA US LLC, Auburn Hills, MI (US)

(72) Inventors: Jacob R. Kennedy, Auburn Hills, MI (US); Alexander Y Morita, Auburn Hills, MI (US); Syed K Arshad-Ali, Auburn Hills, MI (US); Renlin Zhang, Auburn Hills, MI (US)

(73) Assignee: FCA US LLC, Auburn Hills, MI (US)

(*) Notice: Subject to any disclaimer, the term of this patent is extended or adjusted under 35 U.S.C. 154(b) by 65 days.

(21) Appl. No.: 18/786,765

(22) Filed: Jul. 29, 2024

(65) Prior Publication Data

US 2026/0027908 A1 Jan. 29, 2026

(51) Int. Cl.

*B60L 7/18* (2006.01)
*B60L 7/16* (2006.01)
*H02K 7/00* (2006.01)

(52) U.S. Cl.

CPC .................. *B60L 7/18* (2013.01); *B60L 7/16* (2013.01); *B60L 2240/12* (2013.01); *B60L 2240/32* (2013.01); *B60L 2250/24* (2013.01); *H02K 7/003* (2013.01)

(58) Field of Classification Search

CPC .......... B60L 7/18; B60L 7/16; B60L 2240/12; B60L 2240/32; B60L 2250/24; H02K 7/003

See application file for complete search history.

(56) References Cited

U.S. PATENT DOCUMENTS 8,573,709 B2 * 11/2013 Suzuki .................... B60L 3/108 303/151
10,981,555 B2 * 4/2021 Han .................... B60W 10/182
2012/0138375 A1 * 6/2012 Hughes ............... B60W 10/184 180/65.1
2014/0297074 A1 * 10/2014 Lee .................... B60L 15/2063 701/22
2017/0015202 A1 * 1/2017 Bryan .................... B60K 6/445
2020/0047736 A1 * 2/2020 Han .................... B60W 10/182
2022/0314789 A1 * 10/2022 Grimminger ........ B60K 7/0007
2023/0373282 A1 * 11/2023 Trinchieri ........... B60L 15/2054
2024/0051379 A1 * 2/2024 Silvestri ................ F16H 57/037

FOREIGN PATENT DOCUMENTS

CN 117155008 A * 12/2023 ............. H02K 7/025

* cited by examiner

*Primary Examiner* — Peter D Nolan
*Assistant Examiner* — Demetra R Smith-Stewart
(74) *Attorney, Agent, or Firm* — Jeremy J. Klobucar

(57) ABSTRACT

An electrified rear axle regenerative handbrake system for an electrified vehicle includes an electric motor, a rear axle, a handbrake and a controller. The rear axle receives input from the electric motor and transmits torque to rear wheels of the electrified vehicle. The handbrake moves between an unactuated position and an unactuated position and generates a handbrake signal based on a sensed position thereof. The controller receives the handbrake signal; receives a speed and direction of the rear axle; determines a rear axle braking torque command based on the handbrake signal, and the speed and direction of the rear axle; and commands the electric motor to implement a rear axle braking torque based on the determined rear axle braking torque command.

8 Claims, 3 Drawing Sheets

ELECTRIFIED REAR AXLE REGENERATIVE HAND BRAKE

FIELD

The present application relates generally to electrified vehicles and, more particularly, to an electrified rear axle regenerative handbrake system that includes a hand actuated lever to control regenerative braking on an electrified rear axle.

BACKGROUND

Conventional mechanical handbrake systems are used to transmit a braking force onto rear wheels of a vehicle. In some applications, these mechanical handbrakes can be used in dynamic driving situations to encourage vehicle yaw instability during cornering to initiate lateral slip of the rear tires. The typical application of this is in off-road racing, such as rally-cross. Such mechanical handbrake systems require many component and packaging solutions for these components such as, but not limited to, cables, hydraulic cylinders, hoses, brake actuators and friction material. These braking solutions involving mechanical friction have inherent wear of these components, typically friction material and the braking surface, such as a rotor or brake drum. Further, while the total braking energy for hand-braking tends to be small, mechanical handbrakes waste all kinetic energy to heat. To reduce cost, automotive manufacturers do not include both hand brakes and electrified parking brakes, choosing the latter. Electrified parking brakes are typically worm gear actuated and therefore too slow to use in dynamic driving use cases, such as handbrake turning. Accordingly, while such configurations work well for their intended purpose, there is a desire for improvement in the relevant art.

SUMMARY

In accordance with one example aspect of the invention, an electrified rear axle regenerative handbrake system for an electrified vehicle includes an electric motor, a rear axle, a handbrake and a controller. The rear axle receives input from the electric motor and transmits torque to rear wheels of the electrified vehicle. The handbrake moves between an unactuated position and an unactuated position and generates a handbrake signal based on a sensed position thereof. The controller receives the handbrake signal; receives a speed and direction of the rear axle; determines a rear axle braking torque command based on the handbrake signal, and the speed and direction of the rear axle; and commands the electric motor to implement a rear axle braking torque based on the determined rear axle braking torque command.

In examples, the handbrake comprises a handle that rotates about a pivot between the unactuated position and the actuated position.

In addition to the foregoing, the controller further comprises a kinetic friction module that receives the speed of the rear axle and communicates a friction factor output to a multiplication module.

In addition to the foregoing, the controller further comprises a handbrake position to torque module that receives the handbrake signal and communicates an output to the multiplication module.

In addition to the foregoing, the electrified rear axle regenerative handbrake system further comprises an electric drive module having the electric motor, an electric drive gearbox assembly and a power inverter module.

In examples, the electric drive gearbox assembly is configured to transfer generated drive torque from the electric motor to the rear axle including a first axle shaft and a second axle shaft.

In examples, the electric motor includes a stator, a rotor and a rotor output shaft.

In addition to the foregoing, the stator is fixed and the rotor is configured to rotate relative to the stator.

In another example of the present disclosure a method for operating an electrified rear axle regenerative handbrake system for an electrified vehicle is provided. The electrified vehicle has an electric motor that generates drive torque and a rear axle that receives input from the electric motor and transmits torque to rear wheels of the electrified vehicle. A handbrake is provided that moves between an unactuated position and an unactuated position, the handbrake generating a handbrake signal based on a sensed position of the handbrake. A controller receives the handbrake signal; receives a speed and direction of the rear axle; determines a rear axle braking torque command based on the handbrake signal, and the speed and direction of the rear axle; and commands the electric motor to implement a rear axle braking torque based on the determined rear axle braking torque command.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, mechanical handbrake systems require many component and packaging solutions for these components such as, but not limited to, cables, hydraulic cylinders, hoses, brake actuators and friction material. These braking solutions involving mechanical friction have inherent wear of these components, typically friction material and the braking surface, such as a rotor or brake drum. Further, while the total braking energy for hand-braking tends to be small, mechanical handbrakes waste all kinetic energy to heat. In electrified vehicles, to reduce cost, automotive manufacturers incorporate electrified parking brakes. Electrified parking brakes are typically worm gear actuated and therefore too slow to use in dynamic driving use cases, such as handbrake turning.

According to the principles of the present application, systems and methods are described for an electrified rear axle regenerative handbrake system that incorporates an electrified rear axle and physical hand actuated hand brake. The electrified rear axle regenerative handbrake system captures energy via the electrified rear axle instead of letting the energy be dissipated as heat in the mechanical brakes. The electrified rear axle regenerative handbrake system provides improved packaging flexibility as the hydraulic lines, cylinders and brake materials are eliminated. Further, such physical brake components are not being exercised reducing mechanical wear and increasing vehicle durability.

Figure 1:
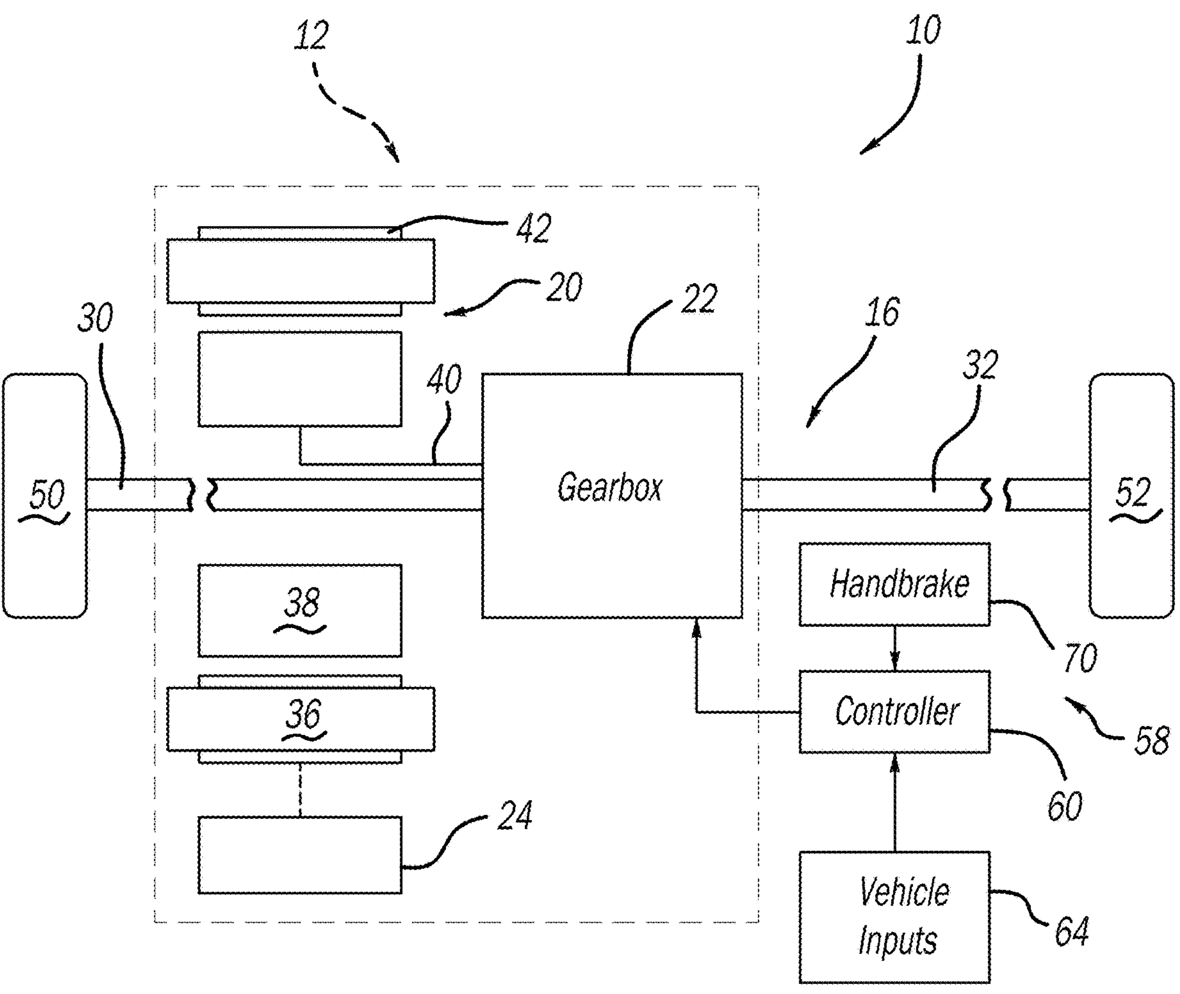
FIG. 1 is a schematic illustration of an example electric vehicle drivetrain having an electrified rear axle regenerative handbrake system including an electrified rear axle and a regenerative handbrake, in accordance with the principles of the present application.

With initial reference to FIG. 1, a vehicle 10 is partially shown in accordance with the principles of the present disclosure. In the example embodiment, vehicle 10 includes an electric drive module (EDM) 12 configured to generate and transfer drive torque to a driveline or electrified rear axle 16 for vehicle propulsion. It will be appreciated that the principles discussed herein can be applicable to any electrified powertrain having an electric motor that at least partially contributes to input torque on the electrified rear axle 16. The EDM 12 generally includes one or more electric drive units or motors 20 (e.g., electric traction motors), an electric drive gearbox assembly 22, and power electronics including a power inverter module (PIM) 24.

The electric motor 20 is selectively connectable via the PIM 24 to a high voltage battery system (not shown) for powering the electric motor 20. The gearbox assembly 22 is configured to transfer the generated drive torque to the electrified rear axle 16, including a first or left axle shaft 30 and a second or right axle shaft 32. In the example shown, the EDM 12 is configured for use on a rear axle of a two-wheel drive vehicle. It is appreciated however that the EDM 12 can be alternatively configured for use on a front axle of a two-wheel drive vehicle. In other examples an EDM 12 can be provided on both of the front and rear axles for a four-wheel drive or all-wheel drive driveline vehicle.

In the example embodiment, the electric motor 20 generally includes a stator 36, a rotor 38, and a rotor output shaft 40. The stator 36 is fixed (e.g., to a housing 42) and the rotor 38 is configured to rotate relative to the stator 36 to drive the rotor shaft 40 and thus the vehicle axles 30, 32 (e.g., half shafts) and therefore respective drive wheels 50, 52. In the illustrated example, the EDM 12 is configured for a rear axle (axles 30, 32) of the vehicle 10, but it will be appreciated that the systems and methods described herein can be applicable to a front axle EDM configuration, and can be replicated on the front and rear axles for four wheel drive.

In the example embodiment, the gearbox assembly 22 is coupled to the electric motor 20 through the output shaft 40. Rotational output from the motor output shaft 40 is received by the gearbox assembly 22, which then transfers the rotational output torque to the axles 30, 32 and therefore the drive wheels 50, 52.

The vehicle 10 according to the present disclosure incorporates an electrified rear axle regenerative handbrake system 58 including the electrified rear axle 16, a controller 60 and a regenerative handbrake 70. As will be described herein, the handbrake 70 produces a signal based on its physical position. The handbrake 70 includes a handle 72 (FIG. 2) that rotates about a pivot 74 between the unactuated and actuated positions generally in the directions indicated by arrow 76.

The signal, correlating to the physical position of the handbrake 70, is communicated to the controller 60. The controller 60 calculates a braking torque command for the electrified rear axle 16. The amount of hand brake actuation correlates to the regenerative braking torque commanded. In examples, the command is bounded by wheel speed (50, 52) of zero to ensure the vehicle 10 cannot be accelerated backwards during implementation.

Figure 2:
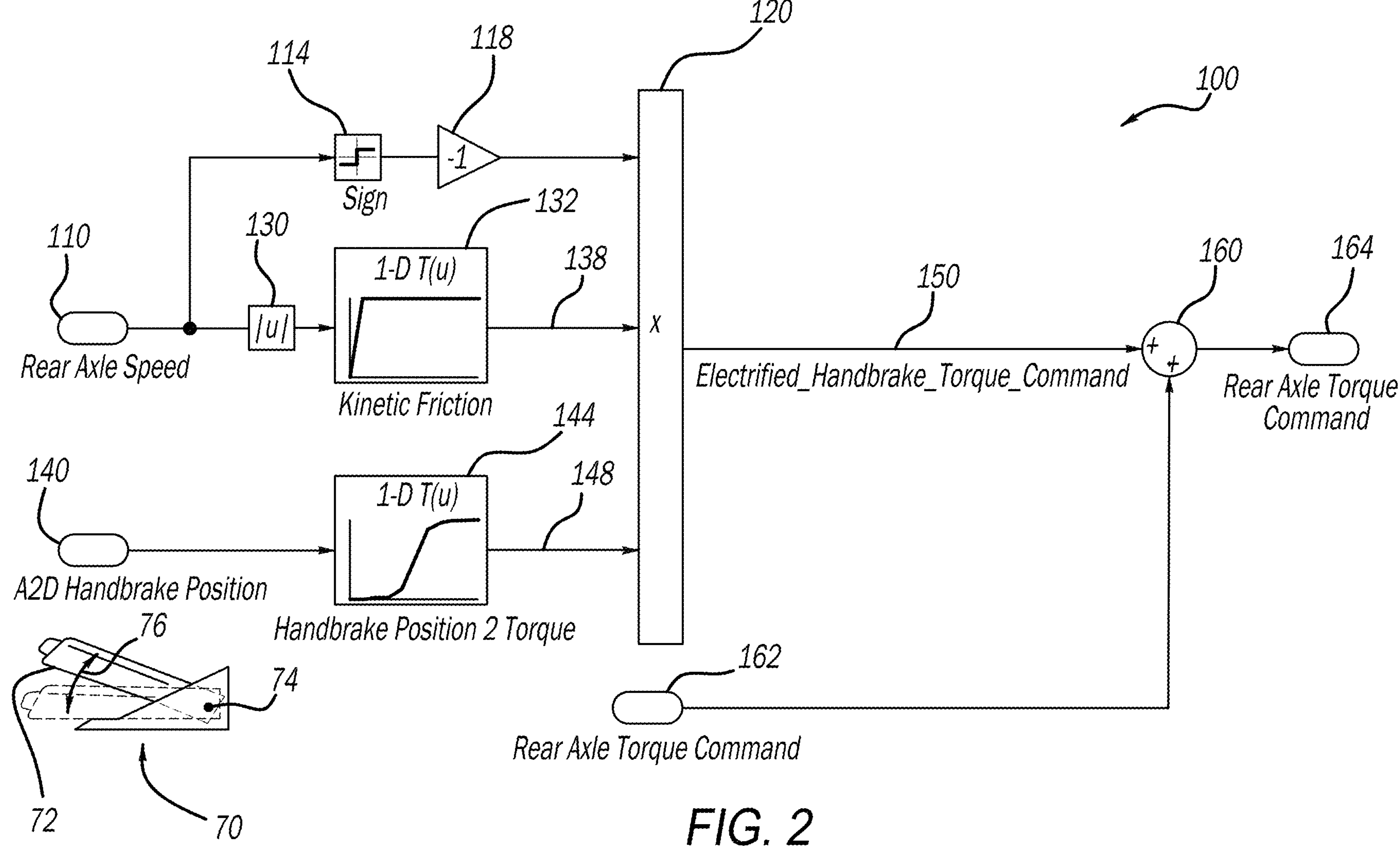
FIG. 2 is a block diagram of a control algorithm implemented in the electrified rear axle regenerative handbrake system shown in FIG. 1, in accordance with the principles of the present application.

Turning now to FIG. 2, a block diagram of a control algorithm implemented in the electrified rear axle regenerative handbrake system 58 in accordance with the principles of the present application is shown and generally identified at reference numeral 100. In general, a rear axle torque command is determined based on a speed of the rear axle 16 and a position of the handbrake 70. The position of the handbrake 70 can be a fully unactuated position, a fully actuated position and any partially actuated position therebetween.

Essentially, the electrified rear axle regenerative handbrake system 58 mimics a conventional hand brake. Instead of using conventional brake hardware (drums, fluids, friction pads, etc.), the electric motor 20 is used to generate negative torque in the rear axle 16. It is appreciated that negative torque does not correlate to negative wheel speed. In some examples the rear wheels 50, 52 are slowed down. In other examples, the rear wheels 50, 52 are stopped from rotating.

A speed of the electrified rear axle 16 is received at 110. The speed 110 is routed through a sign 114 and inverse 118 (collectively acting as a reversal) and input into a multiplication module 120. The speed 110 is also routed through an absolute value 130 and kinetic friction module 132. The kinetic friction module 132 outputs a kinetic friction signal 138 that is input into the multiplication module 120. An analog to digital handbrake position signal 140 is communicated from the handbrake 70.

The handbrake position signal 140 is input to a handbrake position to torque module 144. The handbrake position to toque module 144 outputs a torque signal 148 to the multiplication module 120. The multiplication module 120 outputs an electrified handbrake torque command 150 that is input into a summation module 160. A rear axle driver torque command 162 is also received at the summation module 160. The driver torque request represents the torque command generated by the driver pedal input. The summation module 160 outputs a rear axle torque command 164 to the EDM 12 where the motor 20 implements the torque command.

Figure 3:
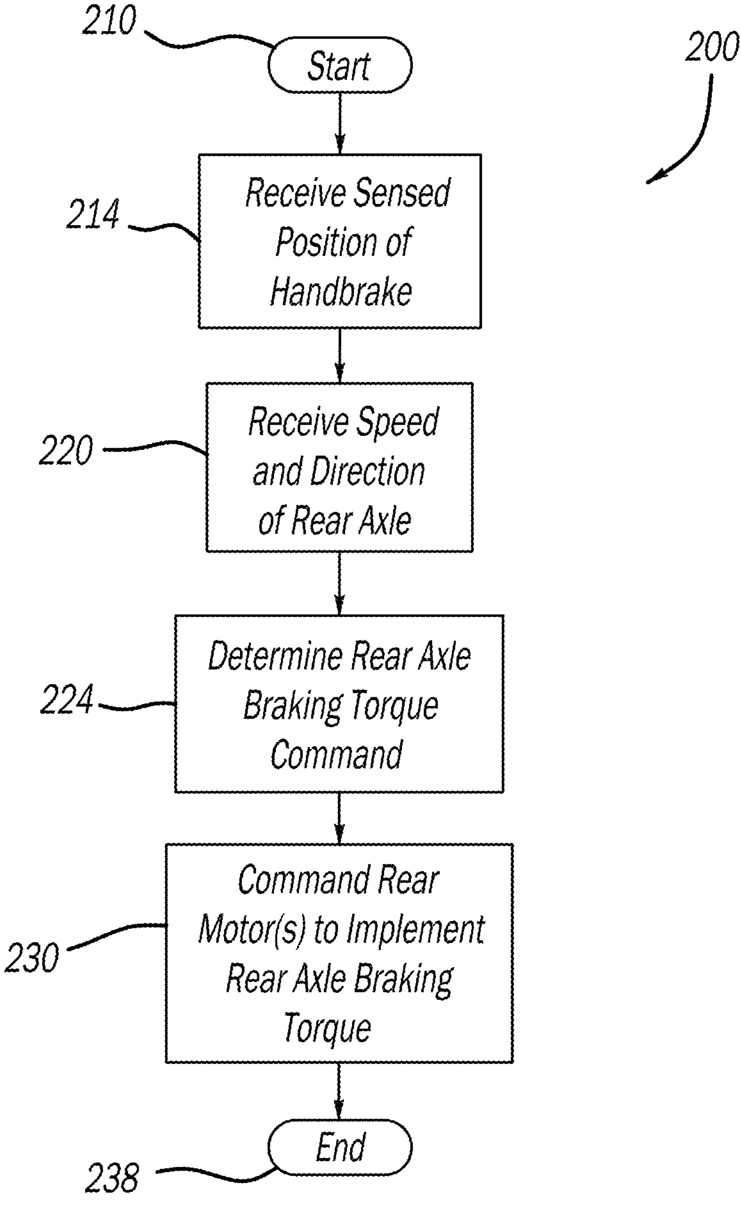
FIG. 3 is a logic flow diagram illustrating exemplary steps implemented by the electrified rear axle regenerative handbrake system shown in FIG. 1, in accordance with the principles of the present application.

With additional reference now to FIG. 3, a logic flow diagram 200 illustrating exemplary steps implemented by the electrified rear axle regenerative handbrake system shown in FIG. 1, in accordance with the principles of the present application will be described. The method starts at 210. At 214, control receives sensed position of the handbrake 70. At 220, control receives speed and direction of the rear axle 16. It will be appreciated that steps 214 and 220 can occur in parallel or in any order. At 224, control determines a rear axle braking torque command. At 230, control commands the motor 20 to implement rear axle braking torque.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified rear axle regenerative handbrake system for an electrified vehicle, the electrified rear axle regenerative handbrake system comprising:

an electric drive module having an electric motor that generates drive torque, an electric drive gearbox assembly, and a power inverter module, wherein the electric motor includes a fixed stator, a rotor that is configured to rotate relative to the stator, and a rotor output shaft;

a rear axle that receives input from the rotor output shaft of the electric motor and transmits torque to two rear drive wheels of the electrified vehicle, wherein the electric drive gearbox assembly is configured to transfer generated drive torque from the electric motor to the two drive wheels through a first axle shaft and a second axle shaft;

a handbrake that moves between an unactuated position and an actuated position, the handbrake generating a handbrake signal based on a sensed position of the handbrake; and a controller that is configured to:

receive the handbrake signal;

receive a speed and direction of the rear axle;

determine a rear axle braking torque command based on the handbrake signal, and the speed and direction of the rear axle; and command the electric motor to implement a rear axle braking torque to the two drive wheels based on the determined rear axle braking torque command.

2. The electrified rear axle regenerative handbrake system of claim 1, wherein the handbrake comprises a handle that rotates about a pivot between the unactuated position and the actuated position.

3. The electrified rear axle regenerative handbrake system of claim 1, wherein the controller further comprises a kinetic friction module that receives the speed of the rear axle and communicates a kinetic friction signal output to a multiplication module.

4. The electrified rear axle regenerative handbrake system of claim 3, wherein the controller further comprises a handbrake position to torque module that receives the handbrake signal and communicates an output to the multiplication module.

5. A method for operating an electrified rear axle regenerative handbrake system for an electrified vehicle, the electrified vehicle having an electric drive module having an electric motor that generates drive torque, an electric drive gearbox assembly, and a power inverter module, wherein the electric motor includes a fixed stator, a rotor that is configured to rotate relative to the stator, and a rotor output shaft and a rear axle that receives input from the rotor output shaft of the electric motor and transmits torque to two rear drive wheels of the electrified vehicle, wherein the electric drive gearbox assembly is configured to transfer generated drive torque from the electric motor to the two drive wheels through a first axle shaft and a second axle shaft, the method comprising:

providing a handbrake that moves between an unactuated position and an actuated position, the handbrake generating a handbrake signal based on a sensed position of the handbrake;

receiving, at a controller, the handbrake signal;

receiving, at the controller, a speed and direction of the rear axle;

determining, at the controller, a rear axle braking torque command based on the handbrake signal, and the speed and direction of the rear axle; and commanding the electric motor to implement a rear axle braking torque to the two drive wheels based on the determined rear axle braking torque command.

6. The method of claim 5, wherein the handbrake comprises a handle that rotates about a pivot between the unactuated position and the actuated position.

7. The method of claim 5, wherein the controller further comprises a kinetic friction module that receives the speed of the rear axle and communicates an output to a multiplication module.

8. The method of claim 7, wherein the controller further comprises a handbrake position to torque module that receives the handbrake signal and communicates an output to the multiplication module.

* * * * *